US010752825B2

(12) United States Patent
Gopal et al.

(10) Patent No.: US 10,752,825 B2
(45) Date of Patent: Aug. 25, 2020

(54) OILFIELD DEPOSIT DISPERSANT AND DISPERSION METHOD

(71) Applicant: SMI Oilfield Equipment And Products FZE, Dubai (AE)

(72) Inventors: Suguna Gopal, Dubai (AE); James McRae, Dubai (AE)

(73) Assignee: SMI OILFIELD EQUIPMENT AND PRODUCTS FZE, Jebel Ali (AE)

( * ) Notice: Subject to any disclaimer, the term of this patent is extended or adjusted under 35 U.S.C. 154(b) by 70 days.

(21) Appl. No.: 15/764,835

(22) PCT Filed: Sep. 30, 2015

(86) PCT No.: PCT/IB2015/057483
§ 371 (c)(1),
(2) Date: Mar. 29, 2018

(87) PCT Pub. No.: WO2017/055893
PCT Pub. Date: Apr. 6, 2017

(65) Prior Publication Data
US 2018/0282608 A1 Oct. 4, 2018

(51) Int. Cl.
C09K 8/52 (2006.01)
C11D 1/62 (2006.01)
(Continued)

(52) U.S. Cl.
CPC .......... C09K 8/52 (2013.01); C11D 1/58 (2013.01); C11D 1/62 (2013.01); C11D 3/0073 (2013.01);
(Continued)

(58) Field of Classification Search
None
See application file for complete search history.

(56) References Cited

U.S. PATENT DOCUMENTS 3,881,008 A   4/1975   Shema et al.
3,932,296 A * 1/1976   Byth .................. C09K 8/74
                                              507/240
(Continued)

FOREIGN PATENT DOCUMENTS

CN   102020776 A   4/2011
CN   103509402 A   1/2014
(Continued)

OTHER PUBLICATIONS

International Search Report issued in PCT/IB2015/057483 dated Nov. 2, 2015 (3 pages).
(Continued)

Primary Examiner — John J Figueroa

(57) ABSTRACT

The present disclosure relates to compositions and methods for the removal of deposits from oilfield apparatus and wellbore surfaces. In particular, removal of deposits comprising heavy hydrocarbon materials and finely divided inorganic solids. The composition includes a mixture of a corrosion inhibitor component which is morpholine or a morpholine derivative having corrosion inhibitor properties, and a surfactant which is a quaternary ammonium compound having biocidal properties. Methods of removing a deposit from a surface or unplugging an oilwell which has been plugged with a deposit, are also included wherein the method comprising contacting the deposit with a composition as disclosed herein for a selected period of time.

19 Claims, 1 Drawing Sheet

(51) Int. Cl.
    *C11D 3/00*     (2006.01)
    *C11D 3/28*     (2006.01)
    *C11D 11/00*     (2006.01)
    *C23G 1/08*     (2006.01)
    *C23G 1/19*     (2006.01)
    *C11D 1/58*     (2006.01)
    *C11D 3/48*     (2006.01)
    *C11D 3/04*     (2006.01)
    *C11D 3/20*     (2006.01)

(52) U.S. Cl.
    CPC ............ *C11D 3/044* (2013.01); *C11D 3/2003* (2013.01); *C11D 3/2086* (2013.01); *C11D 3/28* (2013.01); *C11D 3/48* (2013.01); *C11D 11/0029* (2013.01); *C11D 11/0041* (2013.01); *C23G 1/088* (2013.01); *C23G 1/19* (2013.01); *C09K 2208/32* (2013.01)

(56) References Cited

U.S. PATENT DOCUMENTS

| | | | | |
|---|---|---|---|---|
| 4,432,881 A | * | 2/1984 | Evani | ............... C09D 7/43 |
| | | | | 507/121 |
| 4,525,496 A | * | 6/1985 | Adaway | ............... C08F 2/32 |
| | | | | 523/337 |
| 5,996,692 A | | 12/1999 | Chan et al. | |
| 6,121,222 A | | 9/2000 | Li et al. | |
| 2014/0262287 A1 | * | 9/2014 | Treybig | ............... C09K 8/035 |
| | | | | 166/305.1 |
| 2015/0197682 A1 | * | 7/2015 | Treybig | ............... C09K 8/32 |
| | | | | 507/117 |

FOREIGN PATENT DOCUMENTS

| | | |
|---|---|---|
| CN | 103513521 A | 1/2014 |
| WO | 99/41343 A1 | 8/1999 |
| WO | 2009/076258 A1 | 6/2009 |

OTHER PUBLICATIONS

Written Opinion of the International Searching Authority issued in PCT/IB2015/057483 dated Nov. 2, 2015 (5 pages).

Bohon, et al., "Novel Chemical Dispersant for Removal of Organic/Inorganic "Schmoo" Scale in Produced Water Injection Systems"; NACE International, Corrosion 98, Paper No. 73, 1998 (18 pages).

* cited by examiner

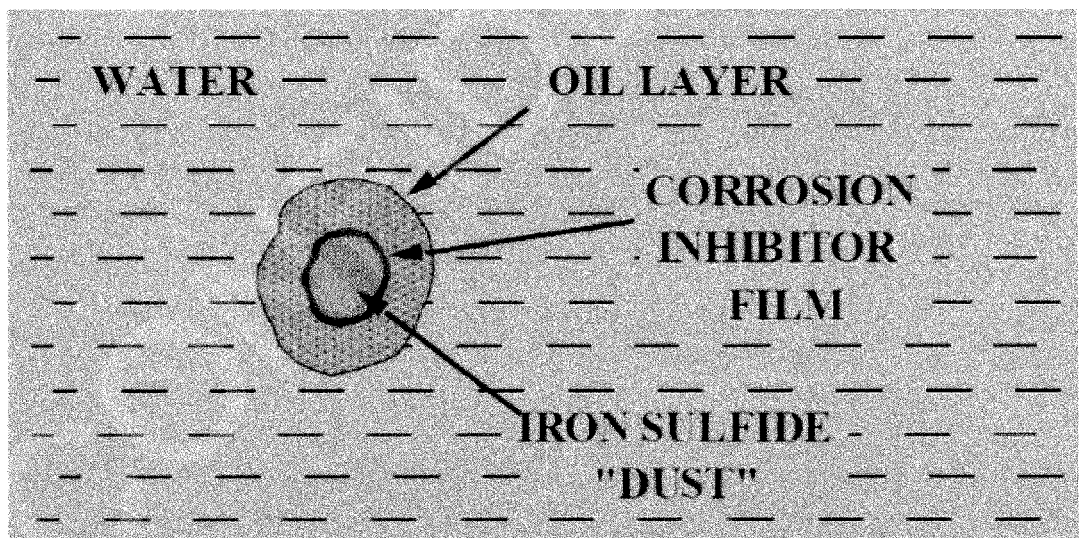

OILFIELD DEPOSIT DISPERSANT AND DISPERSION METHOD

TECHNICAL FIELD

The present disclosure relates to compositions and methods for the removal of deposits from oilfield apparatus and wellbore surfaces. In particular, removal of deposits comprising heavy hydrocarbon materials and finely divided inorganic solids.

BACKGROUND

Mixtures of oil, gas, and water are frequently produced from oilfields and processes for treating these mixtures to separate the oil, gas and water are well known, e.g. gravity separation in tanks. Typically the oil is separated and recovered. The gas component may be separated and recovered separately or, alternatively, the gas may be re-injected, e.g. above an oil-bearing zone or into an oil-bearing zone. If the gas is injected, it may be injected as-recovered or as a mixture with, e.g. nitrogen, carbon dioxide, or a gaseous hydrocarbon to adjust the specific gravity of the gas to a suitable level. The water component may similarly be recovered for re-injection or disposal by other means.

Following separation, the components destined for re-injection are carried from the central separation facility to the re-injection sites along various conduits to the injection lines. It has been found, during this processing and transport, especially when corrosion inhibitors are used in the conduits, e.g. those leading from the wells to the central processing facility, that, over a period of time, heavy hydrocarbon materials and finely divided inorganic solids form deposits on the inner surfaces of the conduits. These deposits typically comprise finely-divided inorganic particles which may include clays, sand, hydraulic fracturing proppant, formation fines, and precipitates of materials including metal components such as iron sulfide. These particles become coated with corrosion inhibitor and/or other hydrocarbon materials. The coated particles may then agglomerate or accumulate additional quantities of heavy hydrocarbon material in the conduits, settling tank or other process areas. This forms a deposit which is sometimes referred to in the industry as "schmoo". This deposit is a paste, solid, or oily substance which adheres to surfaces with which it comes into contact, and is difficult to remove. In particular, the deposit is difficult to remove from the inner surfaces of flow conduits, e.g. flowlines, water/gas injection lines, and wellbore surfaces. The deposit may be removed, at least partially, by pigging flowlines which are above a suitable diameter and configuration that pigs can be run through the lines. Other lines, such as injection lines into wells, small diameter flowlines, the settling tank surfaces, and formation surfaces are not routinely accessible by pigging operations and, accordingly, the deposit accumulates on their contact surfaces. Even cleaning of conduits by pigging can in some cases leave a thin film of the deposit on the inner conduit surface.

The hydrocarbon/particulate deposit is problematic for a number of reasons. The deposit forms a layer on surfaces and bacteria have been found which generate corrosive sulfides and other compounds between the deposit and in contact with the surface. This can result in accelerated corrosion of the surface behind the deposit, the formation of pits and even failure of the surface, e.g. failure of a pipe. The repair or replacement of pipework or other oilfield surfaces is expensive.

The deposited material can also accumulate to such a thickness that it flakes off the surface and deposits or blocks conduits or equipment downstream. For example, the deposit can flake away from the inner surface of a pipe and lodge in the lower portion of a well or line causing a blockage. This can require expensive cleaning operations such as the use of coiled tubing with the injection of organic solvents such as mixtures of diesel oil and xylene. Furthermore, the downtime of the apparatus during cleaning can have a significant commercial impact. This type of deposit is particularly common in wells which are used for alternating water and gas injection. In these wells, the deposit can dry on the inner surfaces of the tubing during gas injection and subsequently crack and be carried downstream or fall into the wellbore, thereby eventually plugging the wellbore. This cracking and dislodging of the deposited material is particularly prevalent when the conduit changes back to a liquid flow following a period of gas flow (during which the deposit dries out).

In view of the difficulties created by this type of deposit, an ongoing search has been directed to the development of a method for the removal of such deposits without the necessity for a pigging or coiled tubing operations.

Mixtures of alkyl polyglycosides and linear ethoxylates in aqueous sodium hydroxide have been investigated as possible compounds to remove these deposits (Bohon et al., NACE International, 98073 (1998), "Novel Chemical Dispersant for Removal of Organic/Inorganic "Schmoo" Scale in Produced Water Injection Systems").

In some cases the known compositions are incompatible with polyacrylamide compounds that may be used in enhanced oil recovery (EOR) applications.

Similar mixtures of alkyl polyglycoside, ethoxylated alcohol, alkali, and alkyl alcohol are described for the removal of hydrocarbon/inorganic particulate deposits from both pipes (in U.S. Pat. No. 5,996,692) and tanks (in WO 99/41343).

Alternative mixtures comprising specific bis-quaternary compounds having an amido moiety have also been investigated for removal of this type of deposit in WO 2009/076258.

SUMMARY

In one aspect, it has been found that hydrocarbon/inorganic particulate deposits can be removed from a surface by treatment with an aqueous composition comprising a mixture of a surfactant component and a corrosion inhibitor. The corrosion inhibitor may also have surfactant properties and the surfactant component also has biocidal properties. The corrosion inhibitor component may, in some aspects, be morpholine or a morpholine derivative. The surfactant component may, in some aspects, be an alkyl di($C_{1-6}$alkyl) benzyl ammonium quaternary compound. The compositions also optionally include a citric acid component.

The compositions themselves form part of the present proposals as do methods for removing, hydrocarbon/inorganic particulate deposits, e.g. by solubilizing the deposits.

BRIEF DESCRIPTION OF THE FIGURES

FIG. 1 shows a schematic representation of a particle of hydrocarbon/inorganic particulate "Schmoo" prior to deposition on a surface.

DETAILED DESCRIPTION

In the present disclosure, the hydrocarbon/inorganic particulate deposit is referred to using the shorthand "deposit".

This also corresponds to the deposit known in the industry as "Schmoo". This deposit typically contains fine inorganic particles (as noted above), e.g. particle size of less than about 250 μm. In some cases, these particles are surface coated with a layer of corrosion inhibitor from the oilfield environment. In some cases, the coated particles then further acquire a hydrocarbon layer and, in many cases, further agglomerate into the deposits that are the target of the present proposals. The exact composition of the deposit varies depending on environment but the deposit contains at least particulate inorganic material and hydrocarbons.

In one aspect, the present proposals relate to an aqueous composition comprising a mixture of a surfactant component and a corrosion inhibitor wherein at least one of the surfactant and corrosion inhibitor has biocidal properties.

The corrosion inhibitor component may, in some cases, be morpholine or a morpholine derivative. The morpholine derivative may be a morpholine ring substituted with one or more groups selected from, $C_{1-6}$ alkyl, $C_{1-6}$ alkyl-O—$C_{1-6}$ alkyl, and oxo; wherein any of the $C_{1-6}$ alkyl groups (either alone or in the $C_{1-6}$ alkyl-O—$C_{1-6}$ alkyl unit) may be optionally substituted with one or more groups selected from, —$NR^1R^2$, and —OH, in which $R^1$ and $R^2$ are each independently selected from H, and $C_{1-6}$ alkyl, or $R^1$ and $R^2$ together with the nitrogen atom to which they are attached form a heterocyclic ring, optionally including one additional heteroatom selected from N, S and O.

In some aspects, the morpholine ring is substituted at the 4-position nitrogen atom with a group selected from $C_{1-6}$ alkyl, and $C_{1-6}$ alkyl-O—$C_{1-6}$ alkyl as defined above (including optional substituents).

In some aspects, the morpholine ring is substituted with only one substituent group from the list defined above. In some aspects, this one substituent is an oxo substituent, optionally in the 3-position. In some aspects, this one substituent is selected from $C_{1-6}$ alkyl, and $C_{1-6}$ alkyl-O—$C_{1-6}$ alkyl as defined above (including optional substituents).

In some aspects, the $C_{1-6}$ alkyl group (either alone or in the $C_{1-6}$ alkyl-O—$C_{1-6}$ alkyl unit) may be substituted with one —$NR^1R^2$ substituent.

Each of the $C_{1-6}$ alkyl units (either alone or in the $C_{1-6}$ alkyl-O—$C_{1-6}$ alkyl unit) may be selected from any straight chain or branched alkyl group. In some aspects, these $C_{1-6}$ alkyl groups, optionally all $C_{1-6}$ alkyl groups in the compound, are ethyl groups.

In some cases, where any of the $C_{1-6}$ alkyl groups is substituted with —$NR^1R^2$, $R^1$ and $R^2$ may both be H, or where $R^1$ and $R^2$ together with the nitrogen atom to which they are attached form a heterocyclic ring, the heterocyclic ring may be morpholinyl.

In some cases, the morpholine derivative may be selected from: amino ethoxyethyl morpholine (optionally 4-amino ethoxyethyl morpholine), hydroxy ethoxyethyl morpholine (optionally 4-hydroxy ethoxyethyl morpholine), 3-morpholinone, dimorpholinodiethyl ether, and (2-aminoethyl) morpholine (optionally 4-(2-aminoethyl) morpholine).

In some aspects the corrosion inhibitor component is morpholine.

The corrosion inhibitor component may be present in the overall composition at between about 1 and 50 wt. %; in some cases, between about 5 and 30 wt. %; in some cases between about 5 and 25 wt. %; in some cases about 10, about 15, or about 20 wt. %

The surfactant component which has biocidal properties may, in some cases, be an alkyl di($C_{1-6}$ alkyl) benzyl ammonium quaternary compound, such as an alkyl dimethyl benzyl ammonium compound, e.g. an alkyl dimethyl benzyl ammonium chloride compound.

In some aspects, the second surfactant which has biocidal properties may be a compound of formula I:

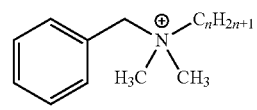

Formula I

In this formula n is an integer from 1 to 20. In some cases n is an integer from 6 to 18, in some cases n is an integer from 8 to 18. In some aspects, n is an even number. In some aspects n is an integer selected from 8, 10, 12, 14, 16, and 18. In some aspects the alkyl chain is an alkyl chain derived from fatty acids selected from caprylic acid, capric acid, lauric acid, myristic acid, palmitic acid, stearic acid, coconut fatty acid, palm kernel fatty acid, babassu fatty acid, nutmeg fatty acid, and may include one or more C═C double bonds. In some aspects, the alkyl chain is derived from coconut fatty acid, i.e. coco alkyldimethylbenzyl ammonium compounds.

The compound of Formula I is used with an anionic counter-ion which may be selected from Cl, Br, and I, and is preferably Cl, i.e. coco alkyldimethylbenzyl ammonium chlorides.

The surfactant component has biocidal activity. This helps with preventing the corrosion, such as pitting, that can take place when bacteria and biofilms get trapped between the deposit and the surface making them difficult to access with traditional biocidal treatments. The inclusion of a biocidal component in the present compositions provides an additional benefit in reducing or eliminating bacterial build-up, e.g. between the deposit and the surface (such as the internal surface of a pipe or storage tank). This component also combats any bacteria that are exposed on dissolution or removal of any overlying deposit by the present compositions, therefore avoiding the bacteria settling elsewhere in the system with the potential to cause further problems.

The surfactant component may also have the effect of penetrating the lipid phase of the deposit making it easier to remove and/or break up, or acting in combination with the corrosion inhibitor, in some cases synergistically, to dissolve or otherwise remove the deposit.

The surfactant component may be present in the overall composition at between about 1 and 50 wt. %; in some cases, between about 5 and 30 wt. %; in some cases between about 5 and 20 wt. %; in some cases about 10, about 15, or about 20 wt. %

The mixture of corrosion inhibitor and surfactant may make up between about 2 and 60 wt. % of the overall composition; in some cases, between about 10 and 50 wt. %; in some cases, between about 20 and 40 wt. %; in some cases between about 25 and 35 wt. %; such as about 30 wt. % of the overall composition.

One benefit of the mixtures proposed herein is that they may be compatible with polyacrylamide compounds. Therefore the compositions are typically usable in enhanced oil recovery (EOR) applications where some known surfactant compositions cannot be used.

In some aspects, the composition also comprises an iron dissolution enhancer component. In some aspects this component may be citric acid.

Citric acid has significant advantages in the present compositions compared to other acids. It chelates readily with metals to form citrates which is particularly beneficial in the present proposals because the deposits typically contain corrosion by-products, such as iron oxides, e.g. due to oxidation processes, which can lead to the formation of insoluble iron hydroxide gels. This type of gel may be water insoluble, however, in the presence of citric acid, the citric acid component chelates the metal and increases its water solubility. In some cases it may also prevent the gel forming in the first place by chelation with the metal component.

Compared to other acids, citric acid also acts as a buffer which is advantageous to keep the present compositions in a working pH range, e.g. for components such as the surfactant, e.g. alkyldimethylbenzylammonium chloride to exert their full beneficial effect. Furthermore, citric acid has the additional benefits of being safe and environmentally friendly, e.g. safe for discharge into the environment.

In some cases, compositions containing this iron dissolution enhancer component are preferred, particularly where the component is citric acid.

This iron dissolution enhancer component has the effect of enhancing the level of dispersion of iron in the solution as compared to a composition that does not include this component, and also may have the benefit of improving the ability of the surfactant component to disperse the iron deposits and retain them in solution or suspension.

Where present, the iron dissolution enhancer component may make up between about 1 and 30 wt. % of the overall composition; in some cases between about 5 and 20 wt. %; in some cases between about 5 and 15 wt. %; such as about 10 wt. % of the overall composition.

The composition may further comprise an alcohol component to enhance miscibility between other components of the composition. Where present, the alcohol component may be selected from alkyl alcohols; in some cases alkyl alcohols having between 3 and 8 carbon atoms which may be linear or branched. In some cases the alcohol component is isopropyl alcohol. The alcohol component is present to enhance miscibility, particularly between the surfactant components and any alkali component.

Where present, the alcohol component may make up between about 1 wt. % and about 20 wt. % of the overall composition; in some cases between about 1 and 10 wt. %; in some cases between about 2 and 8 wt. %, such as about 5 wt. %.

The composition may further comprise an alkali component. Any alkaline component may be used but in some preferred cases that alkali component may be selected from sodium hydroxide, potassium hydroxide, ammonium hydroxide, and mixtures thereof. In some preferred cases the alkali component is sodium hydroxide, such as a 50% aqueous solution of NaCH.

Where present, the alkali component may make up between about 1 and 30 wt. % of the overall composition; in some cases between about 5 and 20 wt. %; in some cases between about 5 and 15 wt. %; such as about 10 wt. % of the overall composition.

The compositions are aqueous compositions. As such, they contain water, in some cases the water makes up the remainder of the composition. For example in some cases, water makes up about 30 to about 80 wt. % of the composition, in some cases about 35 to about 70 wt. %; in some cases about 45 to about 65 wt. %; such as about 50 wt. %, about 55 wt. %, about 60 wt. %, or about 65 wt. % of the overall composition.

In one aspect, the composition is an aqueous composition comprising:

a) a corrosion inhibitor component which is morpholine or a morpholine derivative as defined herein and is present at between about 5 and about 25 wt. %, or between about 15 and about 25 wt. %;
b) a surfactant component which is a di($C_{1-6}$ alkyl) benzyl ammonium quaternary compound as defined herein and is present at between about 5 and about 25 wt. %, or between about 5 and about 15 wt. %;
c) an alcohol which is an alkyl alcohol having between 1 and 8 carbon atoms and is present at between about 1 and about 10 wt. %; and
d) an alkali which is selected from sodium hydroxide, potassium hydroxide, ammonium hydroxide, and mixtures thereof, and is present at between about 5 and 15 wt. %.

The remainder of the composition may, in some cases, be water.

In one aspect the composition is an aqueous composition comprising:

a) a corrosion inhibitor component which is morpholine or a morpholine derivative as defined herein and is present at between about 5 and about 25 wt. %, or between about 15 and about 25 wt. %;
b) a surfactant component which is a di($C_{1-6}$ alkyl) benzyl ammonium quaternary compound and is present at between about 5 and about 25 wt. %, or between about 5 and about 15 wt. %; and
c) an iron dissolution enhancer which is citric acid and is present at between about 5 and about 15 wt. %.

The remainder of the composition may, in some cases, be water.

The compositions presented above may be provided in "ready made" form, i.e. including the water component and ready for use. Alternatively, in one aspect, the compositions may be in concentrated form, i.e. with a reduced amount of water or no water present in the composition, for dilution on site. As such, the present proposals also encompass concentrated forms of the compositions described herein in which the water content is lower than stated for the ready-to-use compositions (and the wt. % of the other components are adjusted accordingly to keep the same ratios between them but simply to reduce or remove the amount of water).

In further aspects, the present disclosure relates to a method of removing deposits comprising hydrocarbons and inorganic particulates from a surface, e.g. a surface of oilfield apparatus.

In some cases, such methods may be useful to remove the deposit from the internal surfaces of oilfield conduits (such as injection pipes), storage tanks, settling tanks, or other apparatus which comes into prolonged contact with wellbore fluids. These methods are particularly suited to removal of such deposits from the internal surfaces of injection pipes, particularly those used for water-alternating-gas (WAG) injection pipes which alternate between carrying water and gas for re-injection. As noted above, these pipes are particularly susceptible to this type of deposit and the deposit is known to regularly dislodge from the walls of the pipes and cause difficulties (such as blockages) especially when switching back to water flow following a period of gas flow.

The method comprises contacting the deposit with a composition as described herein for a selected period of time. This time period may be between about 15 minutes and about 10 hours; in some cases between about 30 minutes and about 5 hours; in some cases between about 1 and about 4 hours.

The method may include applying a composition as described herein to the deposit, e.g. by filling a pipe containing the deposit with the composition, and maintaining contact between the deposit and the composition for a selected period of time (as defined above), e.g. by locking in the composition into the pipe.

The present disclosure further includes a method for unplugging an oilwell which has been plugged with a deposit comprising hydrocarbons and inorganic particulate material, the method comprising injecting a composition as defined herein into the well, retaining the composition in the well for a selected period of time (e.g. as defined above) to dissolve at least a portion of the deposit, and subsequently injecting an aqueous solution through the well and into a subterranean formation in fluid communication with the well.

Also disclosed is a method for removing deposits comprising hydrocarbons and inorganic particulate material from a flow conduit (e.g. an oilfield flow conduit, such as an injector, or a water-alternating-gas injector pipe) by injecting a composition as defined herein into the flow conduit in an amount sufficient to substantially fill the flow conduit; retaining the composition in the conduit for a selected time period (e.g. as defined above), and subsequently flowing an aqueous solution through the conduit to remove the composition and dissolved deposits.

The methods described may include methods for treating a water-alternating-gas conduit to remove a deposit comprising hydrocarbons and inorganic particulates from an internal surface thereof.

The methods described herein may be effective for use in enhanced oil recovery operations, for example operations in the presence of polyacrylamide compositions. As noted above, the present compositions may be compatible with fluids containing polyacrylamide compounds.

microscopy indicated that the predominant elements present in the sample were Fe, S and Si with at least 55% of organic matter.

Compositions were prepared as set out in table 1 below.

The compositions in Table 1 were added to a standard brine (obtained from the subterranean Thumbli water field, India) at a level of 500 ppm of the test solution in 100 ml of Thumbli Brine. Approximately 1 g of the hydrocarbon/inorganic particulate was then added to the test solution.

The solution was transferred to a hot plate, bought to the boil and boiled for 2 hours with intermittent shaking. After 2 hours of boiling, the contents were transferred to a pre-weighed filter paper and washed repeatedly with hot water. The filter paper containing any undissolved material was then dried in an oven for 2 hours to dry the material completely. The filter paper was cooled in a desiccator and reweighed.

The % Efficiency of the deposit remover was calculated as follows (on an "as such" basis):

% Efficiency (as such)={(Original deposit weight−Weight of undissolved deposit)/Original weight}*100.

The % Efficiency of the deposit remover was also calculated on a "dry" basis as follows, using the measured wt. % moisture content of the hydrocarbon/inorganic particulate deposit prior to addition to the test solution.

% Efficiency (dry)=(% Efficiency (as such)*100)/(100−wt. % moisture content)

The test was repeated with 5000 ppm of polyacrylamide (PAM) added to the brine to test compatibility with PAM brines. This is important as PAM is used in high pressure Enhanced Oil Recovery (EOR) applications.

TABLE 1

| | Component (wt. %) | | | | | | | |
|---|---|---|---|---|---|---|---|---|
| | Alkyl polyglycoside | Alkyl ethoxylate | Morpholine Component | "Alkyl quat" | Alcohol | NaOH | Citric Acid | Water |
| Example 1 | — | — | 20 | 10 | 5 | 10 | — | 55 |
| Example 2 | — | — | 10 | 20 | — | — | 10 | 60 |
| Comparative Example 1 | 20 | 20 | — | — | 5 | 10 | — | 45 |

Alkyl polyglycoside = decyl octyl glycosides surfactant
Alkyl ethoxylate = C12-C15 Ethoxylated Alcohol surfactant
Morpholine Component = morpholine as a corrosion inhibitor
Alkyl quat = coco alkyldimethylbenzyl ammonium chlorides, ethylene glycol solvent as a surfactant with biocidal properties
Alcohol = isopropyl alcohol added to enhance miscibility
NaOH = 50% aqueous solution of NaOH
Citric acid = 10-15 wt % aqueous solution as an enhancer of iron dissolution.

EXAMPLES

The following Examples demonstrate aspects of the present disclosure. These Examples are non-limiting and the scope of the invention is determined only by the appended claims.

Three different formulations were made and tested for their ability to dissolve a standard hydrocarbon/inorganic particulate deposit. An existing industrial composition intended to remove such deposits was also tested for comparison.

A sample of hydrocarbon/inorganic particulate ("Schmoo") was obtained from a commercial drilling facility in India. X-Ray Fluorescence testing (handheld Niton XL3t Goldd+ on a powdered sample) and scanning electron Efficiency results for the tested compositions are shown in Table 2 below.

TABLE 2

| | % Efficiency (as is) | % Efficiency (dry) |
|---|---|---|
| Example 1 (no PAM) | 47.82 | 73.57 |
| Example 1 (+PAM) | 48.38 | 74.44 |
| Example 2 (no PAM) | 53.52 | 82.34 |
| Example 2 (+PAM) | 55.44 | 85.29 |
| Comparative Example 1 (no PAM) | 49.30 | 75.85 |

TABLE 2-continued

| | % Efficiency (as is) | % Efficiency (dry) |
|---|---|---|
| Comparative Example 1 (+PAM) | 51.93 | 79.89 |
| Standard Industrial Composition (no PAM) | 47.06 | 72.40 |
| Standard Industrial Composition (+PAM) | NOT COMPATIBLE | |

Standard Industrial Composition = solution of tetra hydroxymethyl phosphonium sulfate (THPS) + ammonium chloride.

Example 1 is a composition comprising a corrosion inhibitor, and surfactant with biocidal function, in alkaline media with alcohol to enhance the mutual solubility.

Example 2 is a combination of a surfactant with biocidal function, corrosion inhibitor, and citric acid which has the effect of enhancing iron dissolution.

The composition of Example 2 shows the best performance of the tested compositions.

Example 3

The composition of Example 2 (table 1 above) was tested for compatibility with PAM.

Thumbli brine was filtered with 0.22 μm filter paper. A solution of 5000 ppm of polyacrylamide was prepared in the Thumbli brine. This solution was then diluted in a 1:1 ratio with Thumbli brine which was mixed with different concentrations of the composition of Example 2 above followed by mixing for 20 mins. The resultant solutions are 0, 100, 300, 500, and 1000 ppm of the composition of Example 2 in 2500 ppm of PAM solution. Viscosity of the solution was measured at different time intervals at 7.34/s shear rate and 62° C. The results are shown in Table 3.

TABLE 3

| | Viscosity (cPs) at concentration (ppm) | | | | |
|---|---|---|---|---|---|
| Time/h | 0 | 100 | 300 | 500 | 1000 |
| 0 | 32.8 | 30.8 | 31.9 | 31.8 | 31.1 |
| 2 | 32.4 | 29.4 | 31.7 | 30.7 | 30.4 |
| 6 | 31.4 | 28.6 | 30.7 | 29.5 | 29.9 |
| 16 | 31.6 | 26.0 | 28.5 | 28.8 | 29.0 |
| 24 | 31.5 | 25.6 | 28.1 | 28.0 | 29.5 |

The results showed that the composition of Example 2 is compatible with PAM so can be used in EOR operations.

Example 4

The composition of Example 2 was tested for iron dissolution activity.

Injection water obtained from an oilfield water re-injection site was used for these tests. 5 ml of 0.2% ferrous ammonium sulphate was added to the injection water. Lab grade $H_2S$ was passed to the solution for one hour. Then different concentrations of the composition of Example 2 were added to the solution (300, 500 & 700 ppm). Separately, samples containing the Standard Industrial Composition used above (solution of THPS+ammonium chloride— "Champion L-1019") at different concentrations (100, 200 & 300 ppm) were prepared. The samples were kept at ambient temperature for one hour, followed by a water bath at 70° C. for one hour. Any changes in appearance were observed at different time intervals. The samples were also filtered and the iron concentration in the filtrate was checked.

The following observations of the visual appearance of the samples were made:
No changes were observed in any sample after initial addition of the test compositions.
After 15 minutes, colour changes were observed in the 300, 500 & 700 ppm samples of the composition of Example 2. A distinct lightening of the initial very dark solution was observed which increased with time.
No change was observed in the solutions containing the Standard Industrial Composition at ambient temperature but at 70° C., the colour lightened slightly.

The analysis of the filtrates showed iron concentrations in solution as set out in table 4.

TABLE 4

| Sample | Iron concentration (ppm) |
|---|---|
| Blank | 0.3 |
| Example 2 300 ppm | 0.8 |
| Example 2 500 ppm | 2.0 |
| Example 2 700 ppm | 6.0 |
| Standard Industrial Composition 100 ppm | 0.5 |
| Standard Industrial Composition 200 ppm | 0.9 |
| Standard Industrial Composition 300 ppm | 1.5 |

The composition of Example 2 showed a greater efficiency at dissolving iron in a brine solution than the Standard Industrial Composition.

The invention claimed is:

1. An aqueous composition comprising a mixture of a corrosion inhibitor component which is a morpholine derivative having corrosion inhibitor properties, and a surfactant which is a quaternary ammonium compound having biocidal properties; wherein the morpholine derivative is a morpholine ring substituted with one or more groups selected from, $C_{1-6}$ alkyl, $C_{1-6}$ alkyl-O—$C_{1-6}$ alkyl, and oxo; wherein any of the $C_{1-6}$ alkyl groups, either alone or in the $C_{1-6}$ alkyl-O—$C_{1-6}$ alkyl unit, may be optionally substituted with one or more groups selected from, —$NR^1R^2$, and —OH, in which $R^1$ and $R^2$ are each independently selected from H, and $C_{1-6}$ alkyl, or $R^1$ and $R^2$ together with the nitrogen atom to which they are attached form a heterocyclic ring; and the quaternary ammonium compound is an alkyl di($C_{1-6}$ alkyl) benzyl ammonium quaternary compound.

2. The composition according to claim 1, wherein the quaternary ammonium compound is a compound of formula I

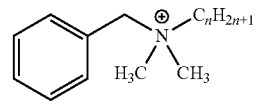

wherein n is an interger from 1 to 20.

3. The composition according to claim 1, wherein the morpholine ring in the morpholine derivative is substituted at the 4-position nitrogen atom with a group selected from $C_{1-6}$ alkyl, and $C_{1-6}$ alkyl-O—$C_{1-6}$ alkyl, with the substituents being optionally substituted as defined in claim 1.

4. The composition according to claim 1, wherein the morpholine ring in the morpholine derivative is substituted with an oxo substituent.

5. The composition according to claim 1, wherein the morpholine ring in the morpholine derivative is substituted with only one group selected from, $C_{1-6}$ alkyl, $C_{1-6}$ alkyl-O—$C_{1-6}$ alkyl, and oxo, with the substituents being optionally substituted as defined in claim 1, optionally wherein the $C_{1-6}$ alkyl group or any of the $C_{1-6}$ alkyl groups in $C_{1-6}$ alkyl-O—$C_{1-6}$ alkyl is substituted with one —$NR^1R^2$ substituent.

6. The composition according to claim 1, wherein the morpholine derivative is selected from: amino ethoxyethyl morpholine, hydroxy ethoxyethyl morpholine, 3-morpholinone, dimorpholinodiethyl ether, and (2-aminoethyl) morpholine.

7. The composition according to claim 1, wherein the morpholine derivative is present in the composition at between 5 and 25 wt. % of the total composition.

8. The composition according to claim 2, wherein in the quaternary ammonium compound of formula I, the integer n is selected from 8, 10, 12, 14, 16, and 18.

9. The composition according to claim 1, wherein in the quaternary ammonium compound of formula I is a coco alkyldimethylbenzyl ammonium mixture.

10. The composition according to claim 1, wherein the quaternary ammonium compound is present in the composition at between 5 and 20 wt. % of the total composition.

11. The composition according to claim 1, further comprising citric acid.

12. The composition according to claim 1, further comprising one or more of: an alkyl alcohol having between 3 and 8 carbon atoms; and an alkali component selected from sodium hydroxide, potassium hydroxide, ammonium hydroxide, and mixtures thereof.

13. A method of removing a deposit from a surface or unplugging an oilwell which has been plugged with a deposit, wherein the deposit comprises hydrocarbons and inorganic particulates, the method comprising contacting the deposit with a composition according to claim 1 for a selected period of time.

14. The method according to claim 13, wherein contacting the deposit with the composition comprises injecting the composition into a wellbore formation or oilfield apparatus; retaining the composition in the formation or apparatus for the selected period of time to dissolve at least a portion of the deposit; and subsequently injecting an aqueous solution through the wellbore or apparatus.

15. The method according to claim 13, wherein the quaternary ammonium compound of the composition is a compound of formula I

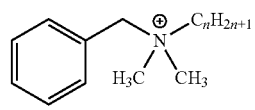

wherein n is an interger from 1 to 20.

16. The method according to claim 13, wherein the composition comprising the morpholine ring in the morpholine derivative is substituted at the 4-position nitrogen atom with a group selected from $C_{1-6}$ alkyl, and $C_{1-6}$ alkyl-O—$C_{1-6}$ alkyl, with the substituents being optionally substituted as defined in claim 13.

17. The method according to claim 13, wherein in the quaternary ammonium compound of formula I is a coco alkyldimethylbenzyl ammonium mixture.

18. The method according to claim 13, wherein the morpholine derivative is present in the composition at between 5 and 25 wt. % of the total composition.

19. The method according to claim 13, wherein the quaternary ammonium compound is present in the composition at between 5 and 20 wt. % of the total composition.

* * * * *